United States Patent
Gonschorek

(10) Patent No.: US 12,428,055 B2
(45) Date of Patent: Sep. 30, 2025

(54) METHOD FOR COOPERATIVE STEERING ANGLE CONTROL, CONTROL DEVICE AND ELECTROMECHANICALLY ASSISTED STEERING SYSTEM

(71) Applicant: ZF Automotive Germany GmbH, Alfdorf (DE)

(72) Inventor: Robert Gonschorek, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 391 days.

(21) Appl. No.: 17/749,760

(22) Filed: May 20, 2022

(65) Prior Publication Data

US 2022/0371657 A1   Nov. 24, 2022

(30) Foreign Application Priority Data

May 21, 2021 (DE) .......................... 102021205253.3

(51) Int. Cl.
| | |
|---|---|
| *B62D 6/00* | (2006.01) |
| *B62D 5/04* | (2006.01) |
| *B62D 15/02* | (2006.01) |

(52) U.S. Cl.
CPC ........... *B62D 6/002* (2013.01); *B62D 5/0481* (2013.01); *B62D 15/0215* (2013.01)

(58) Field of Classification Search
CPC ....... B62D 6/002; B62D 15/0215; B62D 6/00
(Continued)

(56) References Cited

U.S. PATENT DOCUMENTS 5,198,981 A  *  3/1993  Collier-Hallman ......................... B62D 5/0463
                                                                    701/42
5,456,870 A  *  10/1995  Bulgrin ................... B29C 45/78
                                                          700/202
(Continued)

FOREIGN PATENT DOCUMENTS

DE    102006038692 A1 *  2/2008  ............. B62D 6/002
DE    102013201223 A1 *  7/2014  ............. B62D 1/283
(Continued)

*Primary Examiner* — Logan M Kraft
*Assistant Examiner* — Joshua Campbell
(74) *Attorney, Agent, or Firm* — Kristin L. Murphy

(57) ABSTRACT

The disclosure relates to a method for cooperative steering angle control for an electromechanically assisted steering system of a motor vehicle. The steering system has electromechanical steering assistance with an electric motor and at least one controller. The controller has two degrees of freedom, a first of the two degrees of freedom being associated with a torque exerted on a steering wheel, and a second of the two degrees of freedom being associated with a steering angle. The method comprises the following steps: determining a driver torque; ascertaining a reference steering wheel torque by a dynamic feedforward; receiving a reference steering angle; feeding the reference steering angle into a control loop; feeding the determined reference steering wheel torque into the control loop by the dynamic feedforward; and ascertaining a steering wheel torque and a steering angle by the control circuit (34). A control device for an electromechanically assisted steering system of a motor vehicle is also disclosed.

12 Claims, 6 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 6,219,604 | B1 * | 4/2001 | Dilger | B62D 6/008 |
| | | | | 180/443 |
| 6,250,419 | B1 * | 6/2001 | Chabaan | B62D 6/10 |
| | | | | 180/443 |
| 6,789,641 | B2 * | 9/2004 | Mclaughlin | B62D 5/0463 |
| | | | | 701/42 |
| 2004/0256171 | A1 * | 12/2004 | Sugitani | B62D 6/002 |
| | | | | 180/402 |
| 2007/0239333 | A1 * | 10/2007 | Galkowski | B62D 15/025 |
| | | | | 701/41 |
| 2017/0183032 | A1 * | 6/2017 | Wilhelm | B62D 6/08 |
| 2020/0239067 | A1 * | 7/2020 | Wu | B62D 5/0463 |

FOREIGN PATENT DOCUMENTS

| | | | | |
|---|---|---|---|---|
| DE | 102014220865 | A1 | 4/2016 | |
| DE | 102014226781 | A1 | 6/2016 | |
| DE | 102018206089 | A1 | 10/2019 | |
| DE | 102020104449 | A1 | 9/2020 | |
| DE | 102019214446 | A1 | 3/2021 | |
| EP | 2440442 | B1 * | 7/2019 | ............. B62D 5/046 |

* cited by examiner

METHOD FOR COOPERATIVE STEERING ANGLE CONTROL, CONTROL DEVICE AND ELECTROMECHANICALLY ASSISTED STEERING SYSTEM

CROSS-REFERENCE TO RELATED APPLICATION

This application claims priority to German Priority Application No. 102021205253.3, filed May 21, 2021, the disclosure of which is incorporated herein by reference in its entirety.

TECHNICAL FIELD

The disclosure relates to a method for cooperative steering angle control for an electromechanically assisted steering system of a motor vehicle. The disclosure also relates to a control device for an electromechanically assisted steering system of a motor vehicle, to an electromechanically assisted steering system and to a computer program for carrying out the method.

BACKGROUND

Motor vehicles which control their own longitudinal and/or transverse movement in an at least partially automated manner are now widespread. Examples of these exemplary arrangements are lane keeping assistants, brake assistants and distance keeping assistants.

In addition, motor vehicles are already known which can control both the longitudinal and the transverse movement completely automatically, at least at times.

So far, these motor vehicles have in common that they have both a manual mode in which the driver controls the motor vehicle manually and an automatic mode in which the motor vehicle drives at least partially automatically.

However, in certain situations it is necessary that the motor vehicle is in an intermediate state, i.e. in a cooperative mode in which the manual control and the automated control are active at the same time. For example, the automated control should allow the driver to intervene and not simply discard the intervention as a disruption.

A particular challenge is that this transition from automatic to manual mode or to cooperative mode should feel as natural as possible for the driver in terms of control.

SUMMARY

What is needed, therefore, is to provide a method for steering angle control which has an improved control feel in a cooperative mode.

A method for cooperative steering angle control for an electromechanically assisted steering system of a motor vehicle is disclosed herein. The steering system has electromechanical steering assistance with an electric motor and at least one controller. In one exemplary arrangement, the controller has two degrees of freedom, a first of the two degrees of freedom being associated with a torque exerted on a steering wheel, and a second of the two degrees of freedom being associated with a steering angle. The method comprises the following steps:
    determining a driver torque, the driver torque being a torque exerted on the steering wheel by the driver;
    ascertaining a reference steering wheel torque based on the determined driver torque by a dynamic feedforward;
    receiving a reference steering angle;
    feeding the reference steering angle into a control loop, the reference steering angle being a reference variable of the control loop;
    feeding the ascertained reference steering wheel torque into the control loop by the dynamic feedforward; and
    determining a steering wheel torque and a steering angle by the control circuit.

Here and in the following, the term "determine" is to be understood to mean that the corresponding variable is estimated and/or measured.

The term "ascertain" is to be understood to mean that the corresponding size is calculated from a previously determined size.

A "feedforward" is understood to mean that the effects of a fed-in quantity are not fed back.

The method according to the disclosure is based on a concept of using a controller having two degrees of freedom, so that the steering wheel torque and the steering angle of the motor vehicle can be controlled independently of one another. In other words, torque control and steering angle control are combined with one another.

Controlling the steering angle allows the motor vehicle to be controlled in a desired manner, for example along a reference trajectory that is specified by an automated driving system, although deviations from the reference trajectory due to driver intervention are possible.

By controlling the steering wheel torque, a desired control feeling for the driver can be achieved. In particular, in this way the driver feels a steering wheel torque that is symmetrical about the reference trajectory. As a result, the driver receives haptic feedback about the reference trajectory and can decide to steer away from the reference trajectory or to follow it.

The method according to the disclosure therefore also allows the driver to intervene when the motor vehicle is in an at least partially automated mode, in particular because the reference steering wheel torque is fed into the control loop.

However, the automated driving system does not have to be switched off, as is customary in the prior art. Rather, the driver can steer the motor vehicle cooperatively with the automated driving system.

It has been found that during the transition from an automated driving mode to cooperative driving mode, no jump in the steering wheel torque can be felt by the driver.

The method according to the disclosure is suitable both for use in conventional EPS systems and for use in steer-by-wire (SbW) systems.

According to one exemplary arrangement of the disclosure, the dynamic feedforward comprises a virtual torque control loop, the reference steering wheel torque being ascertained by the virtual torque control loop. The dynamic feedforward can comprise a virtual torque generator. The virtual torque control loop is a model of the corresponding torque control loop of the steering system. Accordingly, the virtual torque control loop simulates the effects of the generated reference steering wheel torque and the determined driver torque on the torque control loop.

In another aspect of the disclosure, the dynamic feedforward and/or the control loop are or is a state controller. A simulated effect of the generated reference steering wheel torque and the determined driver torque is consequently shown in a state vector of the dynamic feedforward and can then be taken into account by the control loop.

In one exemplary arrangement of the disclosure, an estimated state vector is ascertained by the dynamic feedforward, the estimated state vector describing effects of the determined driver torque and the reference steering wheel torque on the steering system. The estimated state vector is fed into the control loop and further processed thereby.

In a further exemplary arrangement of the disclosure, the estimated state vector is subtracted from a state vector of the control loop. In this way, the manipulated variable contributions of the dynamic feedforward are invisible to the control loop. This decouples the steering angle control and the torque control from one another. This has the advantage that the steering angle control (i.e. the control of the steering angle of the motor vehicle) and the torque control (i.e. the control of the steering wheel torque perceptible by the driver on the steering wheel) can be designed independently of one another, so that optimal results can be achieved in both areas.

It has been found that this type of decoupling of the steering angle control and the torque control is particularly suitable for EPS systems.

According to a further exemplary arrangement of the disclosure, an estimated angle error is ascertained by the dynamic feedforward, the estimated angle error describing a deviation between the reference steering angle and the actual steering angle. The estimated angle error is fed into the control loop and further processed thereby.

In one particular arrangement, the estimated angle error is subtracted from the reference steering angle of the control loop. In this way, the manipulated variable contributions of the dynamic feedforward are invisible to the control loop. This decouples the steering angle control and the torque control from one another. This has the advantage that the steering angle control (i.e. the control of the steering angle of the motor vehicle) and the torque control (i.e. the control of the steering wheel torque perceptible by the driver on the steering wheel) can be designed independently of one another, so that optimal results can be achieved in both areas.

It has been found that this type of decoupling of the steering angle control and the torque control is particularly suitable for steer-by-wire systems.

According to a further exemplary arrangement of the disclosure, the driver torque is determined by a disturbance variable observer. In this way, the driver torque can be determined more precisely than on the basis of a measurement of the steering wheel torque alone, since effects caused by moments of inertia of the steering system and friction in the steering system can be taken into account by the disturbance variable observer in the calculation.

State space techniques and/or frequency space techniques can be used for the design of the disturbance variable observer.

According to a further exemplary arrangement of the disclosure, the disturbance variable observer determines the driver torque based on a measured steering wheel torque and based on an angular velocity of the steering wheel. The disturbance variable observer determines the driver torque based on a mathematical model of the steering system, the measured steering wheel torque and the angular velocity of the steering wheel being input signals of the mathematical model.

A control device for an electromechanically supported steering system of a motor vehicle, the control device being designed to carry out an above-described method is also disclosed herein.

With regard to the further advantages and properties of the control device, reference is made to the above explanations relating to the method, which also apply to the control device and vice versa.

An electromechanically assisted steering system, having a control device described above and electromechanical steering assistance.

With regard to the further advantages and properties of the steering system, reference is made to the above explanations relating to the method, which also apply to the steering system and vice versa.

In one exemplary arrangement of the disclosure, the electromechanically assisted steering system is designed as an EPS system or as an SbW system.

A computer program having program code which is designed to cause the above-described steering system to carry out an above-described method when the computer program is executed on a computing unit of the control unit of the steering system.

The term "program code" refers here and below to computer-executable instructions in the form of program code and/or program code modules in compiled and/or uncompiled form, which can be in any programming language and/or in machine language.

With regard to the further advantages and properties of the computer program, reference is made to the above explanations relating to the method, which also apply to the control device and vice versa.

BRIEF DESCRIPTION OF DRAWINGS

Further advantages and characteristics of the disclosure can be found in the following description and the accompanying drawings, to which reference is made and in which.

DETAILED DESCRIPTION

Figure 1:
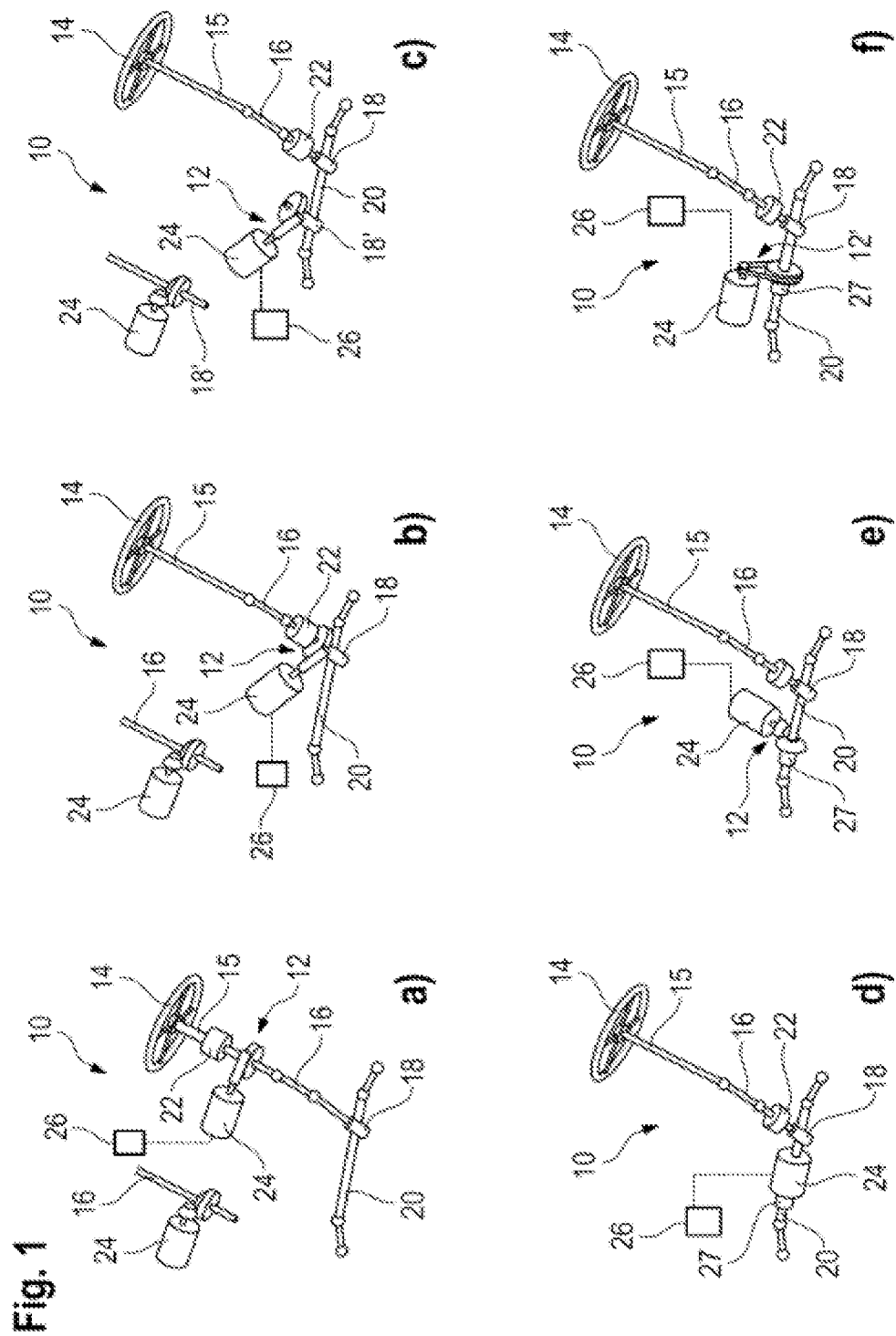
FIG. 1(a) to (f) show different exemplary arrangements of an electromechanically assisted steering system according to the disclosure in a schematic oblique view.

A steering system 10 for a motor vehicle is shown schematically in FIG. 1(a), the steering system 10 having a transmission 12 and being designed as an electromechanically assisted steering system with column drive EPS.

The steering system 10 has a steering wheel 14 which is connected to a first pinion 18 via an upper part of a steering column 15 and via an intermediate steering shaft 16. The first pinion 18 meshes with a rack 20, and therefore a torque is applied thereto.

A torque and/or steering angle sensor 22, which is designed to measure steering torques and/or a steering angle, is arranged on the steering column 15. In one particular example, it is a steering torque and steering angle sensor, which is also referred to as "torque and angle sensor (TAS)" and can provide a steering angle in addition to the steering torque.

Furthermore, an electric motor 24 is provided, which is connected to the transmission 12 in a torque-transmitting manner.

As indicated in FIG. 1(*a*), the transmission 12 can be designed in different ways, for example as a worm gear, as a spur gear, or as a bevel gear.

In any case, at least one torque, which is provided by the electric motor 24, is transmitted to the intermediate steering shaft 16 via the transmission 12 in order to carry out a steering movement.

The electric motor 24 is connected in a signal-transmitting manner to a control unit 26 of the steering system 10, which control unit is indicated only schematically in FIG. 1(*a*) to (*f*).

The control device 26 is designed to determine at least one torque to be applied based on measurement data from the steering system 10 and to transmit corresponding control commands to the electric motor 24 so that the electric motor 24 provides at least the torque to be applied.

The control device 26 is also designed to control, in particular to steer, the motor vehicle at least partially automatically, and one exemplary arrangement, fully automatically. In this case, the electric motor 24 not only provides an assist torque, but rather the entire torque required for controlling or steering the motor vehicle.

The steering system 10 shown in FIG. 1(*b*) differs from that shown in FIG. 1(*a*) in that the electric motor 24 is connected in a torque-transmitting manner via the transmission 12 not to the intermediate steering shaft 16, but to the first pinion 18. The steering system 10 thus has a simple pinion drive, which is also referred to as "single pinion EPS."

The steering system 10 shown in FIG. 1(*c*) has a second pinion 18' which is in meshing engagement with the rack 20. The electric motor 24 is connected in a torque-transmitting manner to the second pinion 18' via the transmission 12. The steering system 10 in this case is therefore a steering system with a double pinion, which is also referred as "dual pinion EPS."

FIG. 1(*d*) to 1(*f*) show further possible exemplary arrangements of the electromechanically assisted steering system 10.

More precisely, FIG. 1(*d*) shows a steering system 10 with a concentric rack drive via a recirculating ball nut 27. Here, the electric motor 24 is arranged directly on the rack 20 and acts on the rack 20 via the recirculating ball nut 27 with the assisting torque.

FIG. 1(*e*) shows a drive in which the transmission 12 is designed as a bevel gear, and in which a recirculating ball nut 27 is attached to the rack 20. The electric motor 24 acts on the rack 20 via the transmission 12 and the recirculating ball nut 27 with the assisting torque.

FIG. 1(*f*) shows a belt drive 12' with a recirculating ball nut 27 attached to the toothed rack 20. An assisting torque applied by the electric motor 24 is transmitted via a belt of the belt drive 12' to the recirculating ball nut 27 and via said ball nut to the rack 20.

Figure 2:
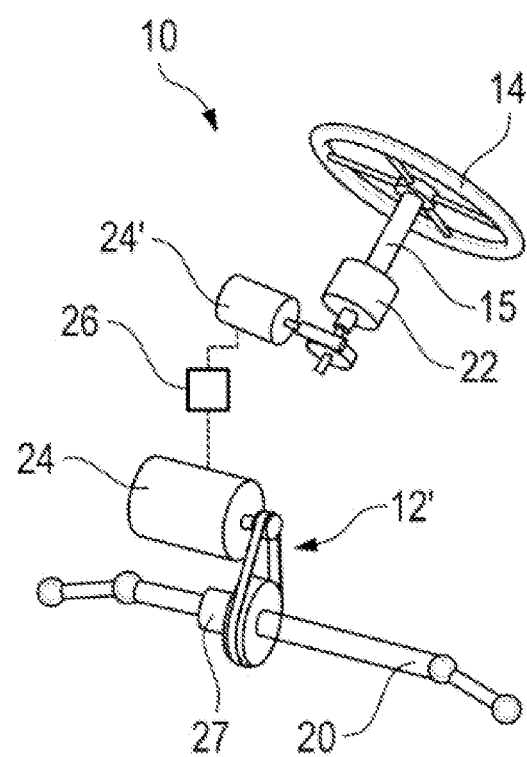
FIG. 2 shows a steer-by-wire exemplary arrangement of the electromechanically assisted steering system according to the disclosure in a schematic oblique view.

FIG. 2 shows a further exemplary arrangement of the steering system 10. The steering system is designed here as a steer-by-wire system, i.e. there is no mechanical operative connection between the steering wheel 14 and the rack 20. Rather, the steering angle sensor 22 ascertains a steering angle and transmits this to the control device 26. The control unit 26 controls the electric motor 24, which is connected to the rack 20 via a belt drive here, to generate a torque necessary for controlling or steering the motor vehicle. In addition, the steering system 10 here has a steering wheel actuator 24', which can apply a torque to the steering wheel 14, for example in order to generate lane feedback.

The electromechanically assisted steering system 10 is designed to carry out a method described below with reference to FIG. 3 to 6 for cooperative steering angle and torque control.

More precisely, the control device 26 comprises a computer program having program code which is designed to cause the steering system 10 to implement the method described below for cooperative steering angle and torque control when the computer program is executed on a computing unit or a processor of the control unit 26 of the steering system 10.

The term "program code" refers here and below to computer-executable instructions in the form of program code and/or program code modules in compiled and/or uncompiled form, which can be in any programming language and/or in machine language.

It should be noted that the method for cooperative steering angle and torque control can be carried out with each of the steering systems 10 according to FIG. 1(*b*) to (*f*) and FIG. 2.

Figure 3:
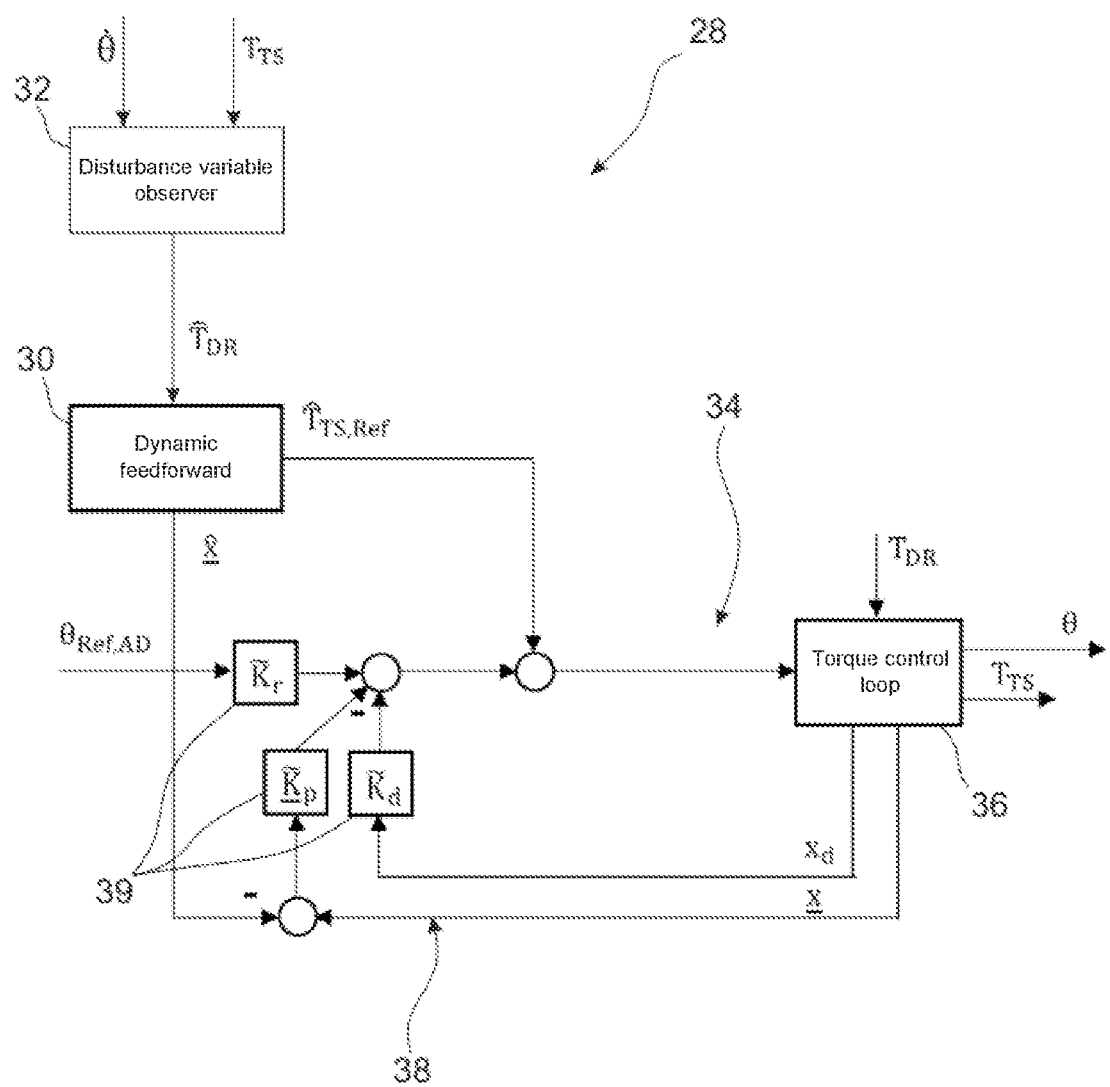
FIG. 3 is a block diagram of a controller according to a first exemplary arrangement.

FIG. 3 shows a block diagram of a first exemplary arrangement of a controller 28 which is used for the method for cooperative steering angle and torque control.

The controller 28 comprises a dynamic feedforward 30, a disturbance variable observer 32 and a control loop 34.

The control loop 34 is designed as a state controller.

The control loop 34 comprises a torque control loop 36 and a steering angle control loop 38.

The torque control loop 36 is an inner control loop of the control loop 34, while the steering angle control loop 38 is an outer control loop of the control loop 34.

The steering angle control loop 38 has a plurality of gain elements 39 with gain factors $\tilde{K}_r$, $\tilde{K}_p$ and $\tilde{K}_d$.

Figure 4:
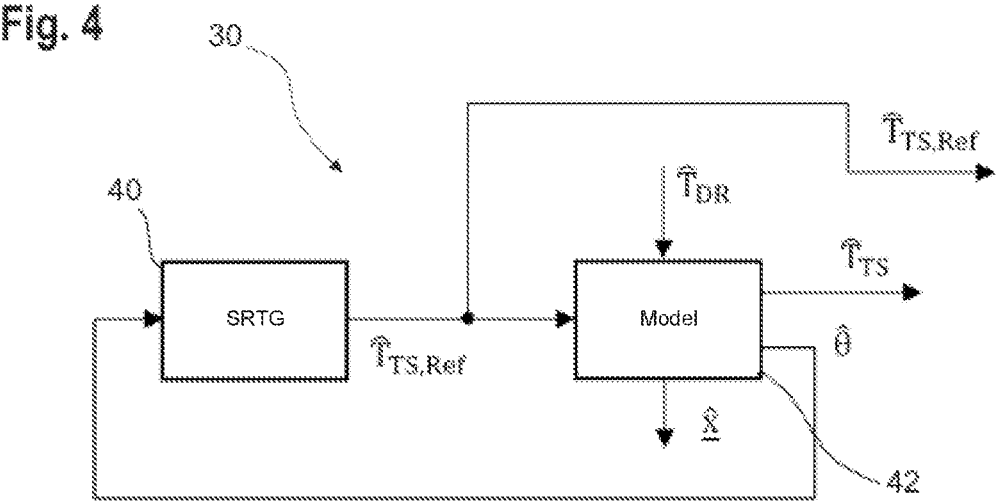
FIG. 4 shows a dynamic feedforward of the control loop from FIG. 3.

FIG. 4 shows more details of the dynamic feedforward 30. The dynamic feedforward 30 comprises a virtual torque generator 40 and a virtual torque control loop 42.

The virtual torque control loop 42 is a model of the torque control loop 36 of the control loop 34.

Figure 5:
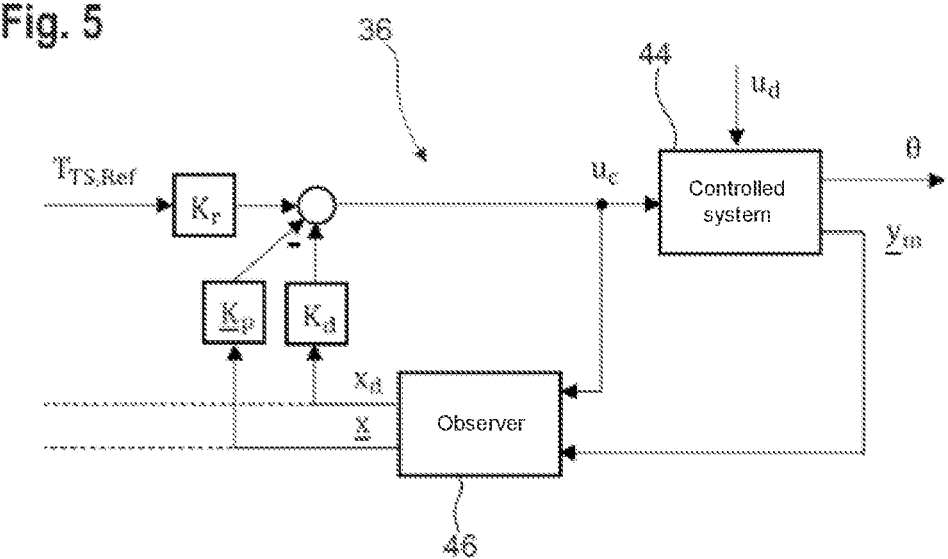
FIG. 5 shows a torque controller of the controller of FIG. 3.

FIG. 5 shows an exemplary arrangement of the torque control loop 36. The torque control loop 36 comprises a controlled system 44 and an observer 46. Furthermore, the torque control loop 36 can comprise a state controller.

The torque control loop 36 is known per se from the prior art, which is why the exact functionality is not reproduced here. In principle, any suitable torque control loop known from the prior art can be used.

Figure 6:
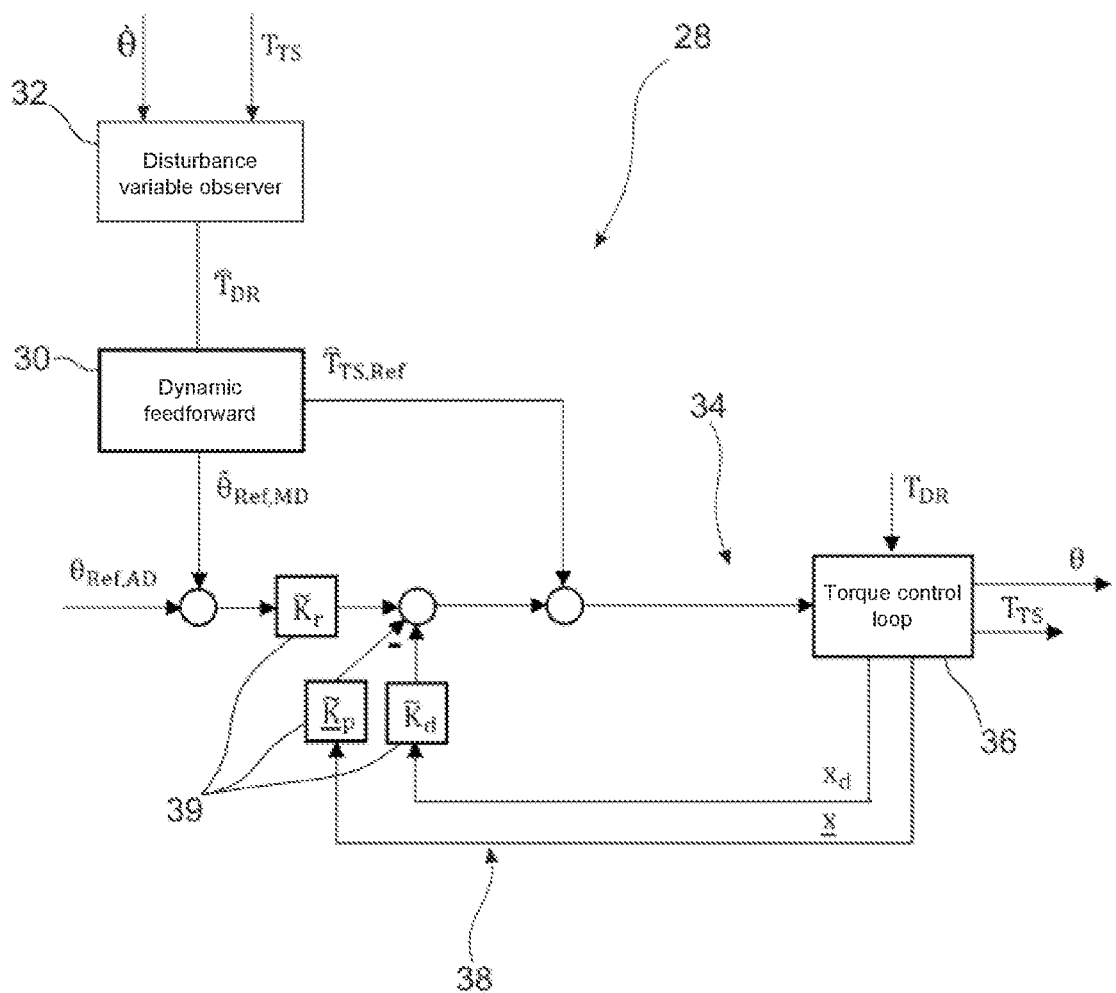
FIG. 6 is a block diagram of a controller according to a second exemplary arrangement.

FIG. 6 shows a second exemplary arrangement of the controller 28. The controller 28 of FIG. 6 differs from the controller 28 of FIG. 3 only in that one of the output variables of the dynamic feedforward 30 is fed into the control loop 34 differently.

Figure 7:
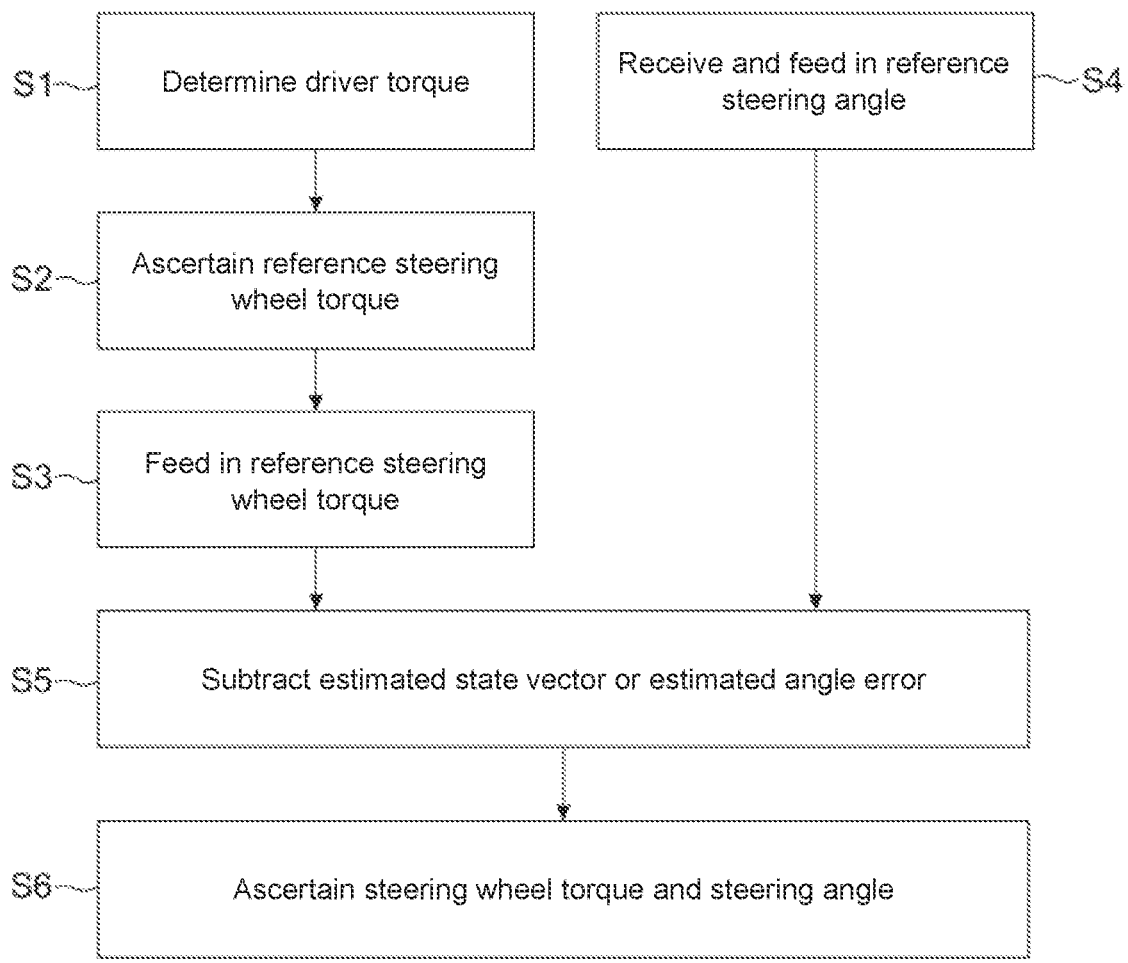
FIG. 7 is a flow diagram of the steps of a method according to the disclosure.

This is described below in the context of the method for steering angle and torque control with reference to FIG. 7, the method being explained first for the exemplary arrangement of the controller 28 shown in FIG. 3.

A driver torque $\hat{T}_{DR}$ is determined by the disturbance variable observer 32 (step S1).

The determined driver torque $\hat{T}_{DR}$ is a torque which the driver exerts on the steering wheel 14.

The disturbance variable observer 32 determines the driver torque $\hat{T}_{DR}$ based on a measured steering wheel torque $T_{TS}$ and based on an angular velocity $\dot{\theta}$ of the steering wheel 14.

More precisely, the disturbance variable observer 32 determines the driver torque $\hat{T}_{DR}$ based on a mathematical model of the steering system 10, the measured steering wheel torque $T_{TS}$ and the angular velocity $\dot{\theta}$ of the steering wheel 14 being inputs or input parameters of the mathematical model.

The disturbance variable observer adjusts the measured steering wheel torque $T_{TS}$ to effects that are caused by moments of inertia of the steering system 10 and by friction in the steering system 10, so that an accurate estimate of the driver torque $\hat{T}_{DR}$ is obtained.

State space techniques and/or frequency space techniques which are known from the prior art can be used for the design of the disturbance variable observer 32.

Based on the determined driver torque $\hat{T}_{DR}$ a reference steering wheel torque is ascertained (step S2) by the dynamic feedforward 30 $\hat{T}_{TS,Ref}$.

More precisely, the torque generator 40 generates the reference steering wheel torque $\hat{T}_{TS,Ref}$. The virtual torque control loop 42 simulates the effects of the reference steering wheel torque $\hat{T}_{TS,Ref}$ and the determined driver torque $\hat{T}_{DR}$ on the torque control loop 36, so that an estimated steering wheel torque $\hat{T}_{TS}$ and an estimated steering angle $\hat{\theta}$ are ascertained on the basis of the mathematical model on which the virtual torque control loop 42 is based.

Furthermore, an estimated state vector is ascertained by the virtual torque control loop 42 $\hat{x}$, which state vector describes the effects of the specific driver torque $\hat{T}_{DR}$ and the reference steering wheel torque $\hat{T}_{TS,Ref}$ on the steering system 10.

The ascertained reference steering wheel torque $\hat{T}_{TS,Ref}$ is fed into the control loop 34 (step S3).

More precisely, the ascertained reference steering wheel torque $\hat{T}_{TS,Ref}$ is fed directly above the torque control loop 36 into the control loop 34.

A reference steering angle $\theta_{Ref,AD}$ is received and fed into the control loop 34 (step S4).

The reference steering angle $\theta_{Ref,AD}$ is provided, for example, by an automated driving system of the motor vehicle. The reference steering angle $\theta_{Ref,AD}$ corresponds to the steering angle required to follow a reference trajectory determined by the automated driving system.

The estimated state vector $\hat{x}$ is subtracted from an actual state vector x of the control circuit 34 (step S5).

The actual state vector x is an output variable of the torque control loop 36.

The resulting state vector $x-\hat{x}$ is fed to the gain element 39 with gain factor $\tilde{K}_p$.

In this way, interventions by the dynamic feedforward 30 for the control loop 34, more precisely for the steering angle control loop 38 of the control loop 34, become invisible.

As a result, the steering angle control loop 38 and the torque control loop 36 are decoupled from one another, so that the steering angle control loop 38 and the torque control loop 36 can be designed independently of one another.

A steering wheel torque $T_{TS}$ and a steering angle $\theta$ are ascertained and adjusted by the control loop 34 (step S6).

The ascertained steering wheel torque $T_{TS}$ corresponds to the torque that the driver should feel at the steering wheel 14. The ascertained steering angle $\theta$ corresponds to a target steering angle for the motor vehicle.

The steering wheel torque $T_{TS}$ and the steering angle $\theta$ can be controlled independently of one another.

The method described above therefore uses a controller that has two degrees of freedom, namely the steering wheel torque $T_{TS}$ and the steering angle $\theta$.

Controlling the steering angle $\theta$ allows the motor vehicle to be controlled in a desired manner, for example along a reference trajectory that is specified by an automated driving system, although deviations from the reference trajectory due to driver intervention are possible.

By controlling the steering wheel torque $T_{TS}$, a desired control feeling for the driver can be achieved. In particular, in this way the driver feels a steering wheel torque $T_{TS}$ that is symmetrical about the reference trajectory. As a result, the driver receives haptic feedback about the reference trajectory and can decide to steer away from the reference trajectory or to follow it.

It has been shown that during the transition from automated driving mode to cooperative driving mode, no jump in the steering wheel torque $T_{TS}$ can be felt by the driver.

The above explanations of the method relate to the first exemplary arrangement of the controller 28 from FIG. 3. It has been found that this variant is particularly suitable for EPS systems, as shown, for example, in FIG. 1a to f.

If, on the other hand, the second exemplary arrangement of the controller 28 from FIG. 6 is used, steps S2 and S5 are modified as described below.

In step S2, an estimated angle error $\hat{\theta}_{Ref,MD}$ is ascertained by the dynamic feedforward 42, the estimated angle error $\hat{\theta}_{Ref,MD}$ describing a deviation between the reference steering angle $\theta_{Ref,AD}$ and the actual steering angle $\theta$.

In step S5, the estimated angle error $\hat{\theta}_{Ref,MD}$ is subtracted from the reference steering angle $\theta_{Ref,AD}$ and fed to the gain element 39 with gain factor $\tilde{K}_r$.

In this way, too, decoupling of the torque control and the steering angle control is achieved. It has been found that this variant is particularly suitable for steer-by-wire systems.

The remaining steps of the method are carried out analogously to the sequence described above.

The invention claimed is:

1. A method for cooperative steering angle control for an electromechanically assisted steering system of a motor vehicle which has electromechanical steering assistance with an electric motor and at least one controller, wherein the controller has two degrees of freedom, wherein a first of the two degrees of freedom is associated with a torque exerted on a steering wheel, and wherein a second of the two degrees of freedom is associated with a steering angle, the method comprising the following steps:
   determining a driver torque, wherein the driver torque is a torque exerted on the steering wheel by a driver;
   ascertaining a reference steering wheel torque-based on the determined driver torque by a dynamic feedforward;
   receiving a reference steering angle;
   feeding the reference steering angle into a control loop, wherein the reference steering angle is a reference variable of the control loop;
   feeding the ascertained reference steering wheel torque into the control loop by the dynamic feedforward; and
   ascertaining a steering wheel torque and a steering angle by the control loop,
   wherein the dynamic feedforward is a state controller and an estimated state vector is ascertained by the dynamic feedforward, the estimated state vector describing effects of the determined driver torque and the reference steering wheel torque on the steering system, wherein the estimated state vector is subtracted from a state vector of the control loop to decouple the control loop for the reference steering angle and a virtual torque control loop from one another.

2. The method according to claim 1, wherein the dynamic feedforward comprises the virtual torque control loop, the reference steering wheel torque being ascertained by the virtual torque control loop.

3. The method according to claim 1, wherein the driver torque is determined by a disturbance variable observer.

4. The method according to claim 1, wherein an estimated angle error is ascertained by the dynamic feedforward, the estimated angle error describing a deviation between the reference steering angle and the actual steering angle.

5. The method according to claim 4, wherein the estimated angle error is subtracted from the reference steering angle of the control circuit.

6. The method according to claim 1, wherein the driver torque is determined by a disturbance variable observer.

7. The method according to claim 6, wherein the disturbance variable observer determines the driver torque based on a measured steering wheel torque and based on an angular velocity of the steering wheel.

8. A control device for an electromechanically assisted steering system of a vehicle, wherein a control device is designed to carry out a method according to claim 1.

9. An electromechanically assisted steering system, having a control device according to claim 8 and electromechanical steering assistance.

10. The electromechanically assisted steering system according to claim 9, wherein the electromechanically assisted steering system is designed as an EPS system or as an SbW system.

11. A computer program having program code which is designed to cause the steering system according to claim 1 to carry out the method for cooperative steering angle control when the computer program is executed on a computing unit of the control unit of the steering system.

12. The method according to claim 1, wherein the control loop is a state controller.

* * * * *